United States Patent [19]

Clark et al.

[11] Patent Number: 4,823,271

[45] Date of Patent: Apr. 18, 1989

[54] DATA PROCESSING ARRANGEMENTS

[75] Inventors: William J. R. Clark, Great Baddow; John J. Ward, Cheltenham, both of England; Harry M. Jones, Edinburgh, Scotland; John H. Powell, Lytham-St.-Annes, England

[73] Assignees: GEC Avionics Limited, Rochester; Smiths Industries p.l.c., London; Ferranti p.l.c., Cheadle; British Aerospace p.l.c., London, all of England

[21] Appl. No.: 770,381

[22] Filed: Aug. 28, 1985

[30] Foreign Application Priority Data

Aug. 29, 1984 [GB] United Kingdom ............... 8421815

[51] Int. Cl.$^4$ ........................................... G06F 15/20
[52] U.S. Cl. ..................................... 364/443; 364/456
[58] Field of Search ............... 364/443, 456, 460, 449; 360/5; 342/63, 64, 65

[56] References Cited

U.S. PATENT DOCUMENTS

| | | |
|---|---|---|
| 3,651,495 | 3/1972 | Sauvan . |
| 3,879,728 | 4/1975 | Wolff .................................... 342/64 |
| 3,992,707 | 11/1976 | Schmidtlein et al. ................ 342/64 |
| 4,164,728 | 8/1979 | Marsh ................................... 342/64 |
| 4,179,693 | 12/1979 | Evans et al. . |
| 4,236,228 | 11/1980 | Nagashima et al. . |
| 4,396,903 | 8/1983 | Habicht et al. ....................... 342/64 |
| 4,490,719 | 12/1984 | Botwin et al. ........................ 342/64 |
| 4,602,336 | 7/1986 | Brown ................................. 364/456 |

FOREIGN PATENT DOCUMENTS

| | | |
|---|---|---|
| 0100097 | 8/1984 | European Pat. Off. . |
| 2043972 | 1/1979 | United Kingdom . |
| 2136996 | 9/1984 | United Kingdom . |

OTHER PUBLICATIONS

"Integrated Naval EW Systems", IEE Proceedings Section A-K, vol. 129, No. 3, part F, Jun. 1982, pp. 194-196, Old Woking, Surry, GB; M. C. D. Pett et al., p. 196, column 1, Line 8-16, FIG. 2.

Primary Examiner—Parshotam S. Lall
Assistant Examiner—Thomas G. Black
Attorney, Agent, or Firm—Spencer & Frank

[57] ABSTRACT

A data processing arrangement is operative to combine data representing different kinds of information from disparate sources. The data is stored under assigned addresses having a mutually compatible co-ordinate format, and is processed using those addresses. Relevant portions of data from a very large amount of information can be readily extracted in this way, and combined with other data which is related by virtue of a common address. The arrangement is applicable to flight management of an aircraft.

20 Claims, 2 Drawing Sheets

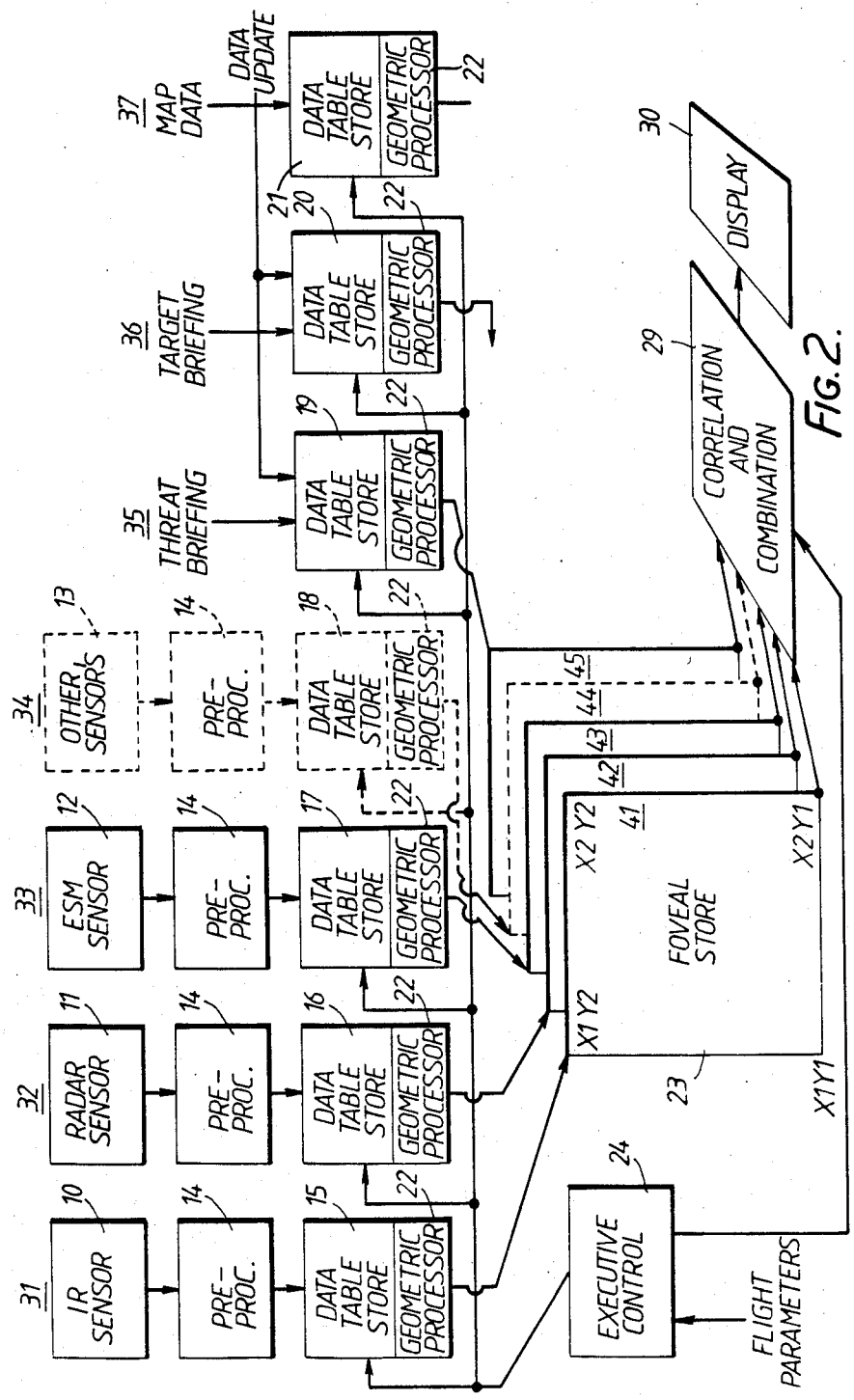

DATA PROCESSING ARRANGEMENTS

This invention relates to a data processing arrangement in which data representing different kinds of information from disparate sources is combined and utilised to produce a resultant output. If large quantities of data from the various sources are arriving rapidly, a very powerful conventional processing capability would be required to handle it and combine it in a useful fashion, particularly if the resultant output is required in near real times. A situation in which this kind of requirement can arise is in an avionics system on board an aircraft in which some data is derived from on-board sensors, such as radar, thermal imaging sensors and electronic signal monitoring receivers, whilst other data, representing three-dimensional terrain maps, location of targets, and disposition of defensive sites, etc., is assembled prior to take-off.

In existing practice, the sub systems of which the sensors form a part are largely self-contained, each separately performing its function and presenting data in a variety of different formats for assimilation by the airborne observer. It has been the traditional role of the aircrew to analyse this separate information and to mentally combine the data as a basis for tactical decisions and mission management.

The volume of the data which can be made available can exceed the capacity of the aircrew to absorb it fully and act upon it in timely fashion. Processing the data in accordance with conventional techniques would require excessively large and powerful computers, which even so would probably be unable to generate an output sufficiently quickly to be useful.

The present invention seeks to provide an improved data processing arrangement.

According to a first aspect of this invention, a data processing arrangement includes means for holding data derived from disparate sources; means for assigning to selected portions of said data addresses in a mutually compatible co-ordinate format; and means utilising the co-ordinate address format for processing the selected portions of data together to generate an output dependent on the nature of said selected portions.

According to a second aspect of this invention a data processing arrangement includes means for holding data derived from disparate sources relating to positional information; means for assigning addresses in a two-dimensional format to selected portions of said data having a common positional relationship and orientation; and means utilising the co-ordinate addresses for correlating data derived from the selected portions to generate a resultant output.

According to a third aspect of this invention there is proposed a method of processing data representing disparate characteristics of a common positional area in which the data is assigned addresses in a mutually compatible format organised as aligned respective two-dimensional data planes to permit correlation between the data having common locations in the different planes.

In a preferred application, the data to be processed represents different characteristics relating to a region over which an aircraft flies The region of interest may be immediately below the aircraft, or it may be somewhat ahead of the aircraft, and it may move to one side of the aircraft track in anticipation of a change in heading. In total, there will be a vast amount of data available if the aircraft may be required to fly over and/or extract data from possibly a very wide area, taking into account visual geographical features, terrain contours, locations of towns and bodies in terms of their thermal radiation properties, as well as other aircraft and the like not having fixed positions. To process all of this information by conventional means and to present it for use by a pilot, or an aircraft navigational system, so that just those factors of greatest imminent importance or danger can be highlighted, calls for an extremely large computing capability, and even so it is currently impracticable to generate useful outputs in real time, i.e. at a rate corresponding to that at which the aircraft moves or the rate at which relevant factors in its environment alter.

The present invention operates, in effect, by extracting from the large amount of data available from separate sources, just that data applicable to a selected area of interest. This area of interest is conveniently termed a foveal patch, as it is upon this localised area that attention is focussed. By organising the different kinds of data in a mutually compatible format whilst preserving its separate identity, the different kinds of data can be processed together and/or combined using correlation techniques. Advantageously the different kinds of data are arranged in respective "two-dimensional planes" having a common area, which area may be congruent or merely overlapping, so that corresponding data elements in the respective data planes are addressable using the same co-ordinates. It will be appreciated that to a certain extent the "two-dimensional planes" is merely a notional concept, as in practice the data elements can be stored in arbitrary locations in convenient kinds of data store, but by assigning compatible co-ordinate addresses, and treating the data as though it were stacked in adjacent planes, attention can very rapidly be focussed on a particular location or region extending through the stack, and all data relevant or applicable to that region can be processed simply and quickly to generate a resultant output.

In this way constant data can remain unchanged, whereas data representing geographical features which alter relatively slowly with respect to, say, a moving aircraft, can be changed by, in effect, sliding its plane to a new position with respect to the foveal patch, and data representing other aircraft, which alters very rapidly, can be changed by entering the new data into the appropriate region of its data plane.

Generally the raw data from the different sources will have different scales (magnifications) and orientations, and in this case the data is brought to the same scale and orientation for the allocation of the compatible two-dimensional addresses.

One conceptual advantage of treating the total data as being organised in a plurality of stacked planes, is that each plane can be regarded as a two-dimensional data image pattern overlying the real world to which it relates, so that powerful and rapid techniques developed for the correlation of complex image patterns can be used to handle this data, even though it may not necessarily represent a real image pattern.

The invention is further described by way of example, with reference to the accompanying drawings, in which:

FIG. 2 shows one embodiment of the invention in block diagramatic form.

Figure 1:
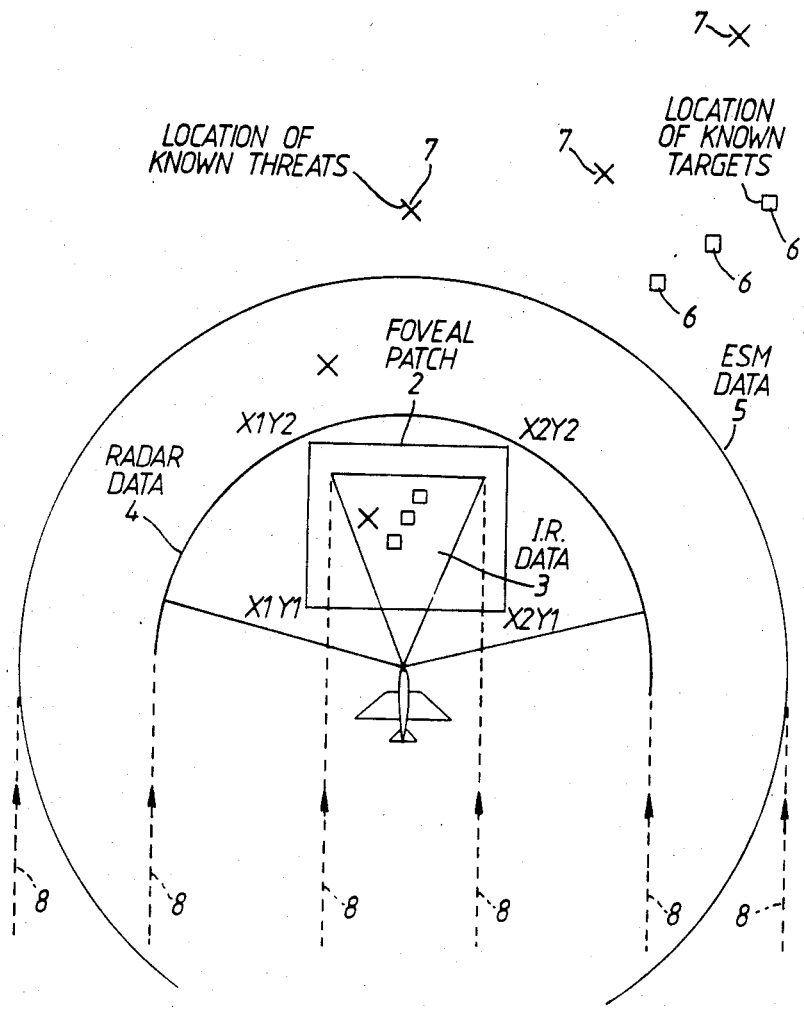
FIG. 1 is an explanatory diagram.

Referring to FIG. 1, the drawing represents in very diagramatic format the area over which an aircraft 1 is flying. The aircraft is of the kind which carries a number of different sensors, each of which may have quite different angles of regard and range capability. The area coverage of the sensors will also be markedly dependent on aircraft height due to resolution, attitude and the effects of terrain screening. In particular, the area capability of three sensors is illustrated, the first and smallest area 3 being that due to the infra-red sensor, and is shown as the central triangular shape The radar coverage is illustrated by the arcuate area 4 centred on the aircraft 1 and finally the electronic signal monitoring also known as electronic support measures (ESM) coverage area is shown by the larger circle 5. As the aircraft moves forwards over the ground, these three areas 3, 4, 5 also move forward at the same rate as represented symbolically by the broken lines 8.

In addition to the information gained during flight from the sensors, information is also available concerning the visual geographical features of the ground over which the aircraft is flying, as well as terrain contour data. Data representing the position of known targets 6 and threats 7 is also carried in board. This will generally be loaded prior to take-off of the aircraft, but could be updated during flight. This data, as well as geographical data, will be available for a very large area coverage extending to continental dimensions, and the quantity of the data available in total will be very large indeed.

A rectangular area immediately in front of the aircraft is identified by the four co-ordinates X1 Y1, X1 Y2, X2 Y2, X2 Y1 and the rectangle defined by these four co-ordinate points is termed a foveal patch 2. Although the foveal patch 2 is smaller than the total area depicted in FIG. 1, it may still be large and encompass a very great deal of data. It is upon this foveal patch 2 that the processing attention is focussed, since it is considered that data relating to characteristics, events and properties within the foveal patch immediately and materially affect the aircraft. This foveal patch is defined with respect to the aircraft so that the foveal patch moves forward with the aircraft. If the aircraft is about to turn, bank or perform some other manoeuvre it is possible temporarily to move the foveal patch ahead or to one side of the current track in anticipation of the new direction. The foveal patch could be moved away from the aircraft to permit inspection of more remote regions, as required. Instead of defining the foveal patch in terms of rectangular Cartesian co-ordinates, any suitable form, e.g. polar co-ordinates could be used.

The way in which the various sensors and sub-systems generate data which can be utilised within the foveal patch is illustrated in FIG. 2.

Referring to FIG. 2, there is shown therein a number of data sub-systems 31 to 37. Three specific sensors are provided, an infra-red sensor 10, a radar sensor 11 and an ESM sensor 12. If required, additional sensors can be provided and one such is represented diagramatically at 13. Each sensor output which is made available in real time is fed to a preprocessor 14 where it is converted to digital format if it is in analogue form, cleaned up as necessary, amplified and put into a signal format which is compatible with a subsequent data table store 15, 16, 17 and 18 respectively. Additionally the preprocessors implement a set of a priori decision rules to effectively apply thresholds to the raw information in order to extract prescribed pieces of information possibly in a statistical manner having probability distributions describing both its locations and the likelihood of its existence at that location; for example, the location of likely targets, or to locate and classify hostile emitters, such as weapon direction radars or lasers. In this case each piece of data can be ascribed a statistical probability value, characterising the likelihood that the decision is true or false on the basis of the degree to which the a priori thresholding rules are met. Each preprocessor advantageously incorporates a data processing arrangement as described in UK patent specification GB No. 2100955A.

As has been previously explained, the output of the sensors is generated in real time as the aircraft flies over a particular area, and thus the rate at which the data is generated can be extremely rapid and result in a large quantity of data to be handled. Other sources of information relevant to the flight of the aircraft are entered into additional data table stores 19, 20 and 21. Data table store 21 represents geographical map data relating to the features of rivers, estuaries, main roads, railway lines, major towns and terrain height and contour information, i.e. three dimensional map data. Data table store 19 represents known threats, such as the position of hostile airfields or armed defensive positions. Finally, data table store 20 represents data concerning targets which the aircraft is required to reach or locate. Additional data table stores can be provided as necessary. Although the data present in data table stores 15, 16, 17 and 18 is continuously and rapidly altered during the flight, the data present in data table store 21 is fixed at the beginning of the flight and thereafter remains constant. Similarly, data in table stores 19, 20 is entered at the commencement of a flight period, but it may be updated to a small extent during flight if necessary to take into account changing circumstances.

The data present in each of the data stores 15 to 21 represents very different properties and characteristics relevant to the aircraft flight, and will generally be of a mutually incompatible nature. Thus data in the different stores will generally have different scales, i.e. data within a particular location will relate to an area of a different size. Furthermore, as the data is acquired at different times during the flight path and at different rates, the effective orientation may be different for each store with respect to, say, the current heading of the aircraft. Particularly, the scale in relation to the geographical data will be a function of aircraft height, attitude, roll and pitch and the like. Selected portions of data in each data table store are fed into a respective two-dimensional plane of a foveal store 23 via a geometric processor 22. The foveal store receives from the data table store only information relevant to the foveal patch 2 depicted in FIG. 1. This area may be relatively small and each plane of the foveal store requires only a relatively small amount of data to be entered into it.

The data is to be converted into a compatible format by the geometrical processor 22 which alters the scale and orientation of the data as required under the control of an executive control circuit 24 which monitors flight parameters of the aircraft as necessary. The geometric processor can take the form described in UK patent specification GB No. 2100956A. As the data is entered into the foveal store it adopts co-ordinate positions in an XY basis which are a function of the position in the plane in which that data is held. Similar corresponding co-ordinate positions apply to each of the five foveal planes 41 to 45 illustrated in FIG. 2.

Thus, under the control of the executive control circuit 4 is nominated a foveal patch defined by the co-ordinates X1 Y1, X2 Y1, X2 Y2, X1 Y2 and all data in each data table store 15 to 21 between the locations prescribed by the foveal patch is down loaded into a corresponding foveal store plane 41 to 45 wherein the location of each data element corresponds in an exact spatial relationship with objects in the original scene.

It will be appreciated that any convenient form of data storage may be used to implement the foveal store and that the concept of a plurality of two-dimensional planes need not correspond to the physical way in which the data is held and retrieved. Thus the foveal store may simply represent different sections of a very large random access store. However, in practice, it may be particularly convenient to implement each plane as a dedicated array of high speed registers. By presenting the large amount of data as small sections of different planes having a common positional axis or area of applicability, the data can be relatively easily and rapidly processed in a straightforward manner and which does not require a very large capacity powerful computer.

The contents of the different planes of the foveal store are fed out to the correlation and combination circuit 29 which assesses the different inputs and correlates or combines them in a number of predetermined ways in order to produce an output. Correlation and/or combination can proceed between each pair of planes separately or a number of the planes can be processed together, and the output of the circuit 29 is passed to the display 30 for presentation to a pilot.

For example; cross-correlation of radar and thermal imaging and planned target position will yield a correlation surface in which correlation peaks corresponding to locations where radar and IR and planned targets are co-located will yield a high likelihood of a true target location. An important aspect of this approach is that exact geographical correspondence is not a necessary prerequisite of a successful detection affecting only the magnitude, not the existence of a correlation peak. Further correlation processes can enable hostile emitters detected by ESM receivers to be correlated with known emitters to establish which threats are active. Additionally, targets and threats can be correlated to establish optimum engagement tactics and risk assessments. In this particular case two points may be noted. Firstly, the ESM data will usually consist not of a point location but a bearing with an associated uncertainty. The correlation surface of more than one bearing from a target array or of correspondence between point locations (known sites) or targets or of bearing data from more than one aircraft, or bearing data derived from more than one time sample, will each have its own characteristics and be interpretable by known image processing techniques. It is merely necessary to read out the contents of each plane in step with data from adjacent planes and to compare the bit streams on a bit-by-bit basis using known correlation techniques. The process of correlation for two-dimensional image patterns is referred to in an article entitled "A Pattern Recognition Technique for Scene Matching of Dissimilar Imagery" by Boland, Rangareth, Malcolm, Proc., 18th IEEE Conference on Decision and Control, 12-14th December, 1979. Digital correlators are produced by TRW Inc.(U.S.A.) under type numbers TDC 1023J and TDC 1004J. The content of the foveal store plane can be processed whilst another portion of it is being updated, so as to generate an output quickly which is relevant to the current circumstances of a fast moving aircraft.

The data produced as a consequence of the various correlation and combination processes will subsequently by used, directly or after immediate storage, either for direct display to the aircrew or to provide an input to other avionic sub-systems associated for example, with weapon aiming, defensive systems management, or the like.

An interface arrangement may be interposed between the circuit 29 and the display 30 to process the available output in terms of probability data so as to enable the display 30 to present information as to the best course of action. Such an arrangement is disclosed in UK patent application No. 8420095.

In an alternative embodiment certain of the foveal store planes may be employed to compare data from disparate sources before being loaded into the data table stores or additional foveal store planes can be used for this purpose. This is particularly valuable when the probability of detection of individual targets is low because of the presence of clutter having some of the characteristics of the wanted targets. By comparing data from dissimilar sensors, whilst it is probable that targets will correlate between sensors, it is less likely that clutter will similarly correlate. For example, an active tank target might be expected to be metal and hot, giving a good radar and infra-red (IR) response, whilst an abandoned vehicle, or a cattle shed, or a pyrotechnic flare would give one response but not the other. Under such circumstances the ability to correlate signals prior to thresholding by preprocessors is advantageous.

In this case the probability data resulting from the initial comparison of data from disparate sources is entered into both of the associated data table stores, so that it can be used as previously when entered into the respective planes of the foveal store 23.

We claim:

1. A data processing arrangement including:
   (a) means for holding data derived from disparate sources relating to positional information;
   (b) means for assigning addresses in a two-dimensional format to selected portions of said data from each source representing spatial fields having a common positional relationship and orientation; and
   (c) correlation means utilizing the co-ordinate addresses for combining and correlating data derived from the selected portions to generate a resultant combined output.

2. An arrangement as claimed in claim 1 and wherein said data represents different characteristics relating to a region over which an aircraft flies.

3. An arrangement as claimed in claim 2 and wherein the data representing particular characteristics of the common positional area are arranged in respective two-dimensional planes having a common address.

4. An arrangement as claimed in claim 2 and wherein means are provided for accepting information representing different characteristics of the common positional area, and for converting it to data having a predetermined scale and orientation prior to assigning said addresses.

5. An arrangement as claimed in claim 1 and wherein the data representing particular characteristics of the common spatial field are arranged in respective formats having a common address.

6. An arrangement as claimed in claim 1 and wherein means are provided for accepting information representing different characteristics of the common spatial field of each disparate source, and for converting it to data representing a predetermined scale and orientation prior to assigning said addresses.

7. An arrangement as claimed in claim 6, and wherein means are provided for processing said information prior to assigning said addresses to produce for utilization data having specified properties, and wherein said processed data is assigned said addresses.

8. An arrangement as claimed in claim 1 and wherein means are provided for modifying the addresses of said data representing particular characteristics independently of addresses of other data.

9. An arrangement as claimed in claim 1 and wherein said means for correlating data is operative upon only that data lying within a specified address area, (termed herein a "foveal patch").

10. An arrangement as claimed in claim 1 wherein said means for holding data includes input means coupled to at least one of a radar source, an infra-red source, an electronic signal monitoring source and stored data on targets and threats, said processing means generating an output to assist in target and threat recognition in response to said input means.

11. A data processing system including:
(a) means for holding data derived from disparate sources relating to positional information;
(b) means for assigning addresses in a mutually compatible co-ordinate format to selected portions of said data from each source representing a common spatial field; and
(c) correlation means utilizing said co-ordiante address format for combining and correlating the selected portions of data together to generate a combined output dependent on the nature of said selected portions.

12. An arrangement as claimed in claim 11 and wherein said data represents different characteristics relating to a region over which an aircraft flies.

13. An arrangement as claimed in claim 11 and wherein the data representing particular characteristics of the common spatial field are arranged in respective two-dimensional formats having a common address.

14. An arrangement as claimed in claim 11 and wherein means are provided for accepting information representing different characteristics of the common spatial field, and for converting it to data representing a predetermined scale and orientation prior to assigning said addresses.

15. An arrangement as claimed in claim 14, and wherein means are provided for processing said information prior to assigning said addresses to produce for utilization data having specified properties, and wherein said processed data is assigned said addresses.

16. An arrangement as claimed in claim 11 and wherein means are provided for modifying the addresses of said data representing particular characteristics independently of addresses of other data.

17. An arrangement as claimed in claim 11 and wherein said means for processing data is operative upon only that data lying within a specified address area; (termed herein a "foveal patch").

18. An arrangement as claimed in claim 17, and wherein means are provided for processing said information prior to assigning said addresses to produce for utilization data having specified properties, and wherein said processed data is assigned said addresses.

19. An arrangement as claimed in claim 11 wherein said means for holding data includes input means coupled to at least one of a radar source, and infra-red source, an electronic signal monitoring source and stored data on targets and threats, said processing means generating an output to assist in target and threat recognition in response to said input means.

20. A method of processing data derived from disparate sources relating to positional information, comprising the steps of:
(a) assigning addresses in a mutually compatible format to selected portions of data from each source representing a common spatial field organized as aligned respective two-dimensional data planes, and
(b) combining and correlating data having common locations in the different planes to generate a combined resultant output.

* * * * *